455-5 EX

OR 3,859,596

United States Patent [19] [11] 3,859,596

Jannery et al. [45] Jan. 7, 1975

[54] CABLE TELEVISION TWO-WAY COMMUNICATION SYSTEM

[75] Inventors: George E. Jannery, Ridgefield, Conn.; Mark P. Messinger, New York, N.Y.

[73] Assignee: Computer Cable Corporation, Ridgefield, Conn.

[22] Filed: Nov. 24, 1972

[21] Appl. No.: 309,077

[52] U.S. Cl. .......... 325/31, 178/DIG. 13, 179/2 AS, 325/53, 325/308

[51] Int. Cl. .......... H04n 7/16

[58] Field of Search .......... 325/31, 51, 53, 308, 309; 178/DIG. 13, 5.1 R; 179/2 AS

[56] References Cited

UNITED STATES PATENTS

| | | | |
|---|---|---|---|
| 3,668,307 | 6/1972 | Face et al. | 325/308 |
| 3,676,580 | 11/1972 | Beck | 178/5.1 R |
| 3,733,430 | 5/1973 | Thompson et al. | 178/DIG. 13 |
| 3,757,035 | 9/1973 | Sullivan | 325/31 |

*Primary Examiner*—Robert L. Griffin
*Assistant Examiner*—Marc E. Bookbinder
*Attorney, Agent, or Firm*—DeLio and Montgomery

[57] ABSTRACT

This disclosure relates to a two-way communication for use on cable television systems where each user terminal may be individually polled for service requirements, and such requirements provided on a responsive basis. Each user terminal has a unique address and recognizes polling signals directed only to that address.

18 Claims, 10 Drawing Figures

CABLE TELEVISION TWO-WAY COMMUNICATION SYSTEM

This invention relates to two-way cable communication systems, and more particularly relates to a cable TV system (CTV) or community antenna television (CATV) system having provision for two-way communication between a central transmitting and processing station and individual user terminals.

Cable television (CATV) through the use of coaxial cables provides a wide band bi-directional communications capacity to the general public. Frequency response in the cable in a forward direction is typically from 50 MHZ to 250 MHZ and above, with a reverse feed capability below 50 MHZ. This allows for simultaneous bi-directional digital communications at kilobit and even megabit rates in addition to the normal television signals.

However, presently known and proposed two-way communications systems on CATV cables have limitations such as slow user polling rates precluding rapid user interaction, narrow band communications employing a number of discrete frequencies for data transmission, and/or may be affected by the action of a number of users, and communication codes which do not allow the head end to address each subscriber individually.

Electronic information on a coaxial cable travels at speeds approximating 0.6 to 0.8 the speed of light in free space. This may be translated to approximately 5 microseconds per mile. In a cable system with cable lengths of 20 miles, signals transmitted from the central facility are delayed for as much as 100 microseconds before being received at the user terminal. This delay presents no problem for normal television usage; however, if a digital signal from a computer or other transmitting device were to be transmitted through this cable to a consumer-responsive device 20 miles away and return data is anticipated, 200 microseconds would elapse. While this is a relatively short time, it is extremely slow by computer standards, and the cumulative effect over a large number of subscribers would be significant. The propagation delay must be accommodated for in the system design. Generally speaking, a responsive electronic device is one in which the results of an external stimulus occurs with a delay of about 1 second. This delay can vary up to as much as 3 seconds in some applications, however, at the possible expense of user satisfaction. Assuming that 1 second is the maximum time lapse permissible in a responsive cable system, the cable trunk with a large number of users distributed uniformly over a 20 mile length would have an average round trip propagation delay of 100 microseconds for each message. If each of the users on a cable were to be sequentially polled by the central computer, the maximum number served in a time-responsive situation would be 10,000. This, however, does not include data transmission time which is a direct function of the amount of data and data transmission speeds. In a typical situation, it may be reasonable to allow an additional 100 microseconds for data transmission and this reduces the number of users to 5,000.

The number of users which may be accommodated on a cable in an interactive mode will therefore depend on the length of the cable, the time duration of the transmission and return messages, or the length thereof and data rate.

The present invention provides a two-way CATV system which permits a satisfactory response time from all requests at user terminals and which permits the efficient interaction of an electronic computer as a central processor with a plurality of cable systems. This permits each user terminal to be polled and a response to any request determined by the poll to be responded to in a time which is not objectionable to the user.

In the present invention, total computer activity for a single data exchange may be approximately 10 microseconds and therefore on a single channel basis the computer may be considered to be essentially unapplied. The present invention structures a system incorporating multi-channel time-sharing resulting in substantial increase in efficiency in use of the computer facility. Each channel can serve one group of users employing the criteria of time-responsiveness previously mentioned.

The invention further provides an economical and improved user terminal device which may be polled by the central processing station on the average of every second to determine if the user has made a specific request, and also to monitor the user terminal to determine the channel that the user is viewing for billing purposes. Each user terminal is independent of others and may at any time be replaced by one having greater message capabilities. Additionally, user terminals of greater or lesser message capability may be added to a cable system at any time.

In the present invention, a plurality of cable systems may be served from a central processing station which would include a mini-computer which would cyclically address all stations on one channel individually and no more than one data inquiry exists on a given data channel at any instant in time. Each channel would include a data buffer for temporary storage of a response from a polled user terminal and signify that the computer may initiate the next inquiry for that channel. Received data is interrogated by the computer to determine if any immediate service requirements exist and, if so, the necessary response would be assigned to the top of the polling list. With this configuration, propagation delay in the cable is no longer the prime determining factor for system response. The maximum number of users is now a function of the communication bandwidth available and the computer processing speeds, neither of which poses a problem, since if properly used, sufficient communication bandwidth is available in multiprocessor computer systems.

A system embodying the invention, in one form thereof, includes a CATV mixer adapted to transmit video signals and binary coded polling messages over a cable to a multiplicity of user terminals. Interfacing means couple the mixer to a central processor in the form of a general purpose computer which originates binary polling signals to each user terminal on a cable system. The polling signals are frequency keyed and transmitted together with timing or clock pulses through the CATV mixer. Each polling signal contains the address of a particular user plus other data. Each user terminal includes a demodulator for reconverting the frequency keyed binary signal to bit form together with clock pulses. The demodulated binary code is serially clocked into a shift register. If a decoder at the user terminal recognizes its own address, data in a register at the user terminal is gated into the shift register and the data therein continuously clocked into a local modulator for transmission back over the cable. The user terminal modulator is enabled only when the address of its terminal is recognized and transmits frequency keyed binary data in time relation with the clock signals. A return demodulator means between the cable and computer reconverts the frequency keyed user terminal signal to binary form and clock pulses, and return interfacing means store returned messages for presentation to the computer for processing.

The invention further provides a new and improved user terminal including television signal frequency conversion means under control of the central processing station to facilitate channel selection by the user.

An object of this invention is to provide a new and improved two-way communication system using a CATV coaxial cable between a central station and each individual user.

Another object of this invention is to provide such a system which may be fully compatible with a computer to insure efficient use of the computer with a plurality of cable systems.

Another object of this invention is to provide a system of the type described in which each user terminal may be individually addressed by a polling message from the central station and which will then re-transmit any data stored at the user terminal to the central processor.

Another object of this invention is to provide a user terminal which may be identified by binary code pecular to that terminal and which requires a minimum of components.

Another object of this invention is to provide a system of the type described which may readily be expanded to accommodate various types of data in future applications.

A further object of this invention is to provide a new and improved CATV converter for use at a user terminal which may be enabled and disabled with respect to particular stations from a central processing point.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

Figure 4:
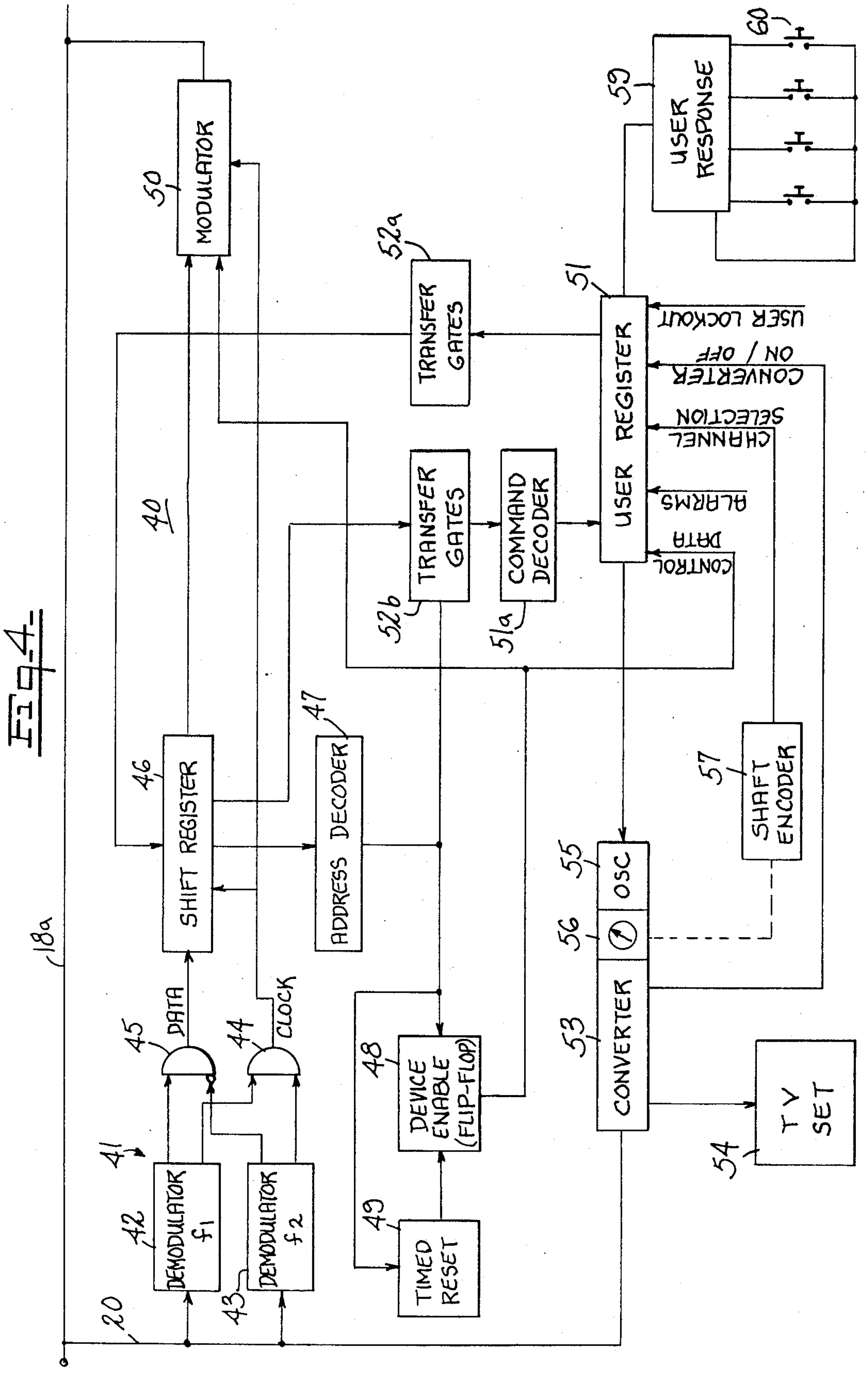
FIG. 4 is a block diagram of a user terminal connected to a CATV cable.
Figure 7A:
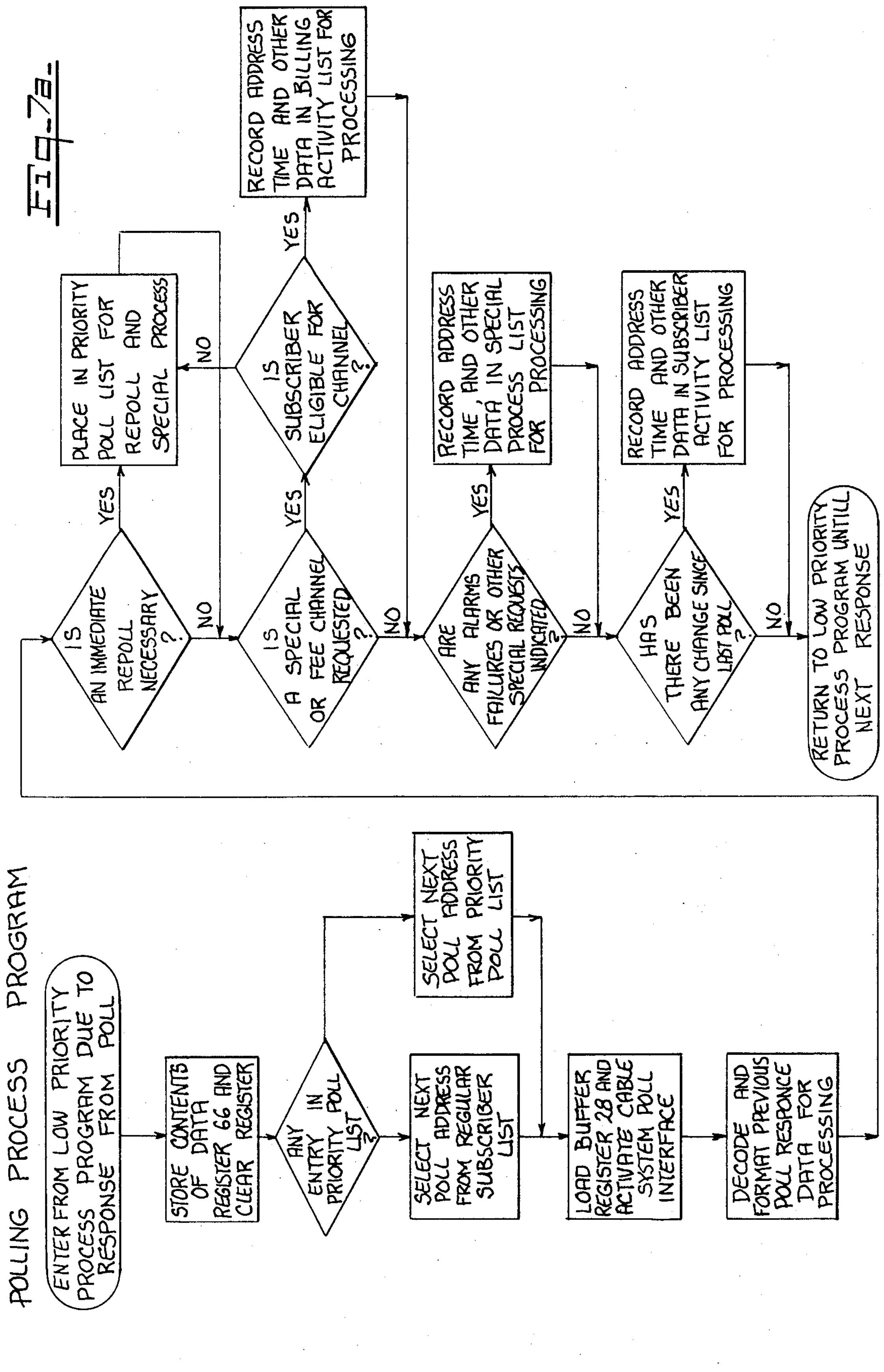
Figure 7B:
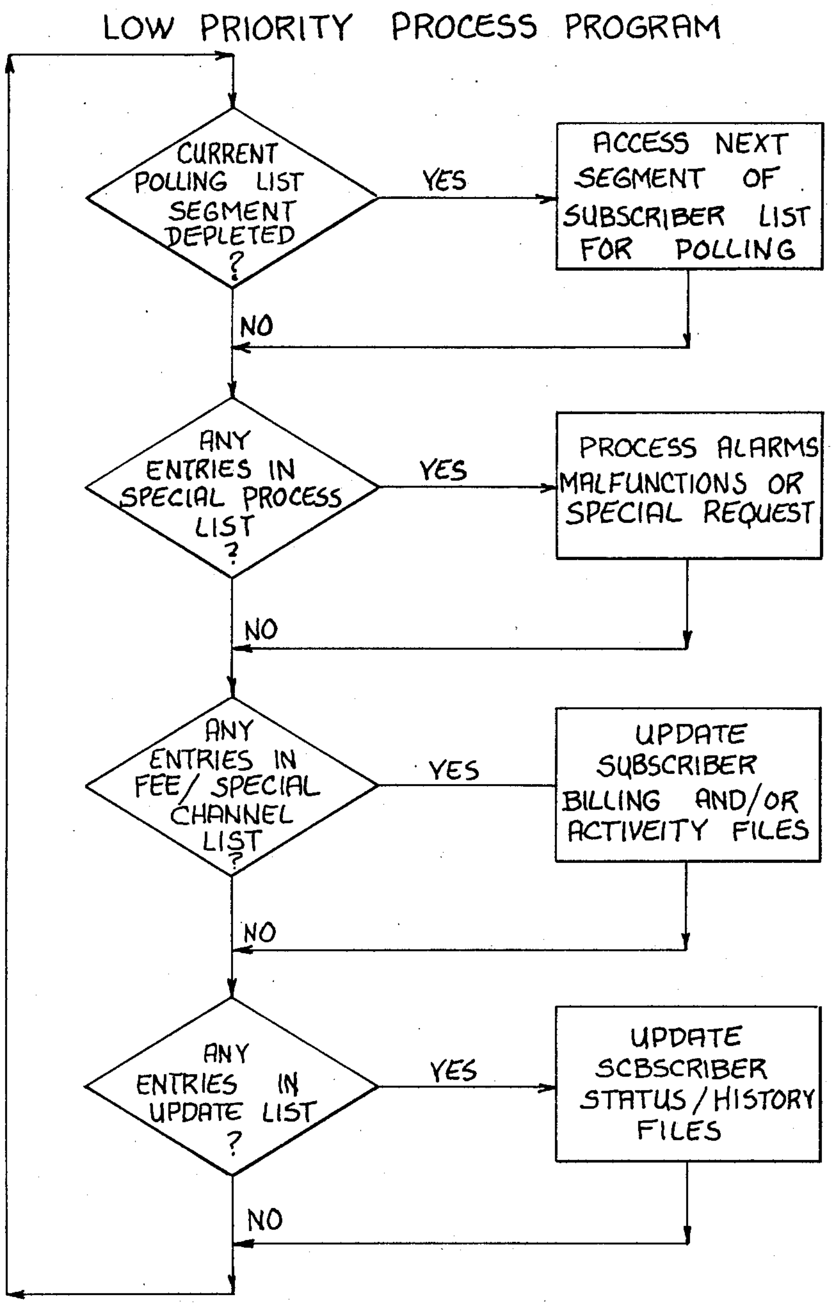
Figure 8:
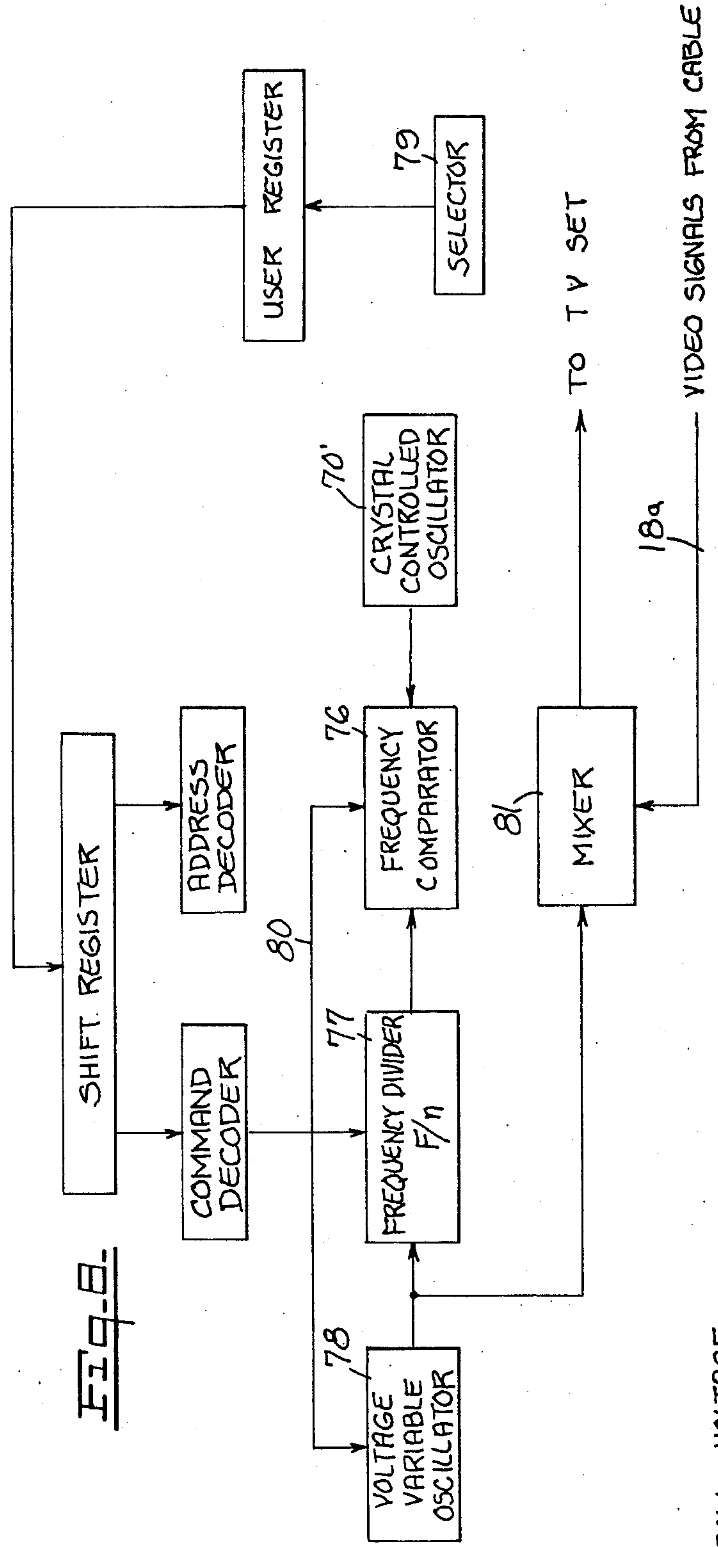
Figure 9:
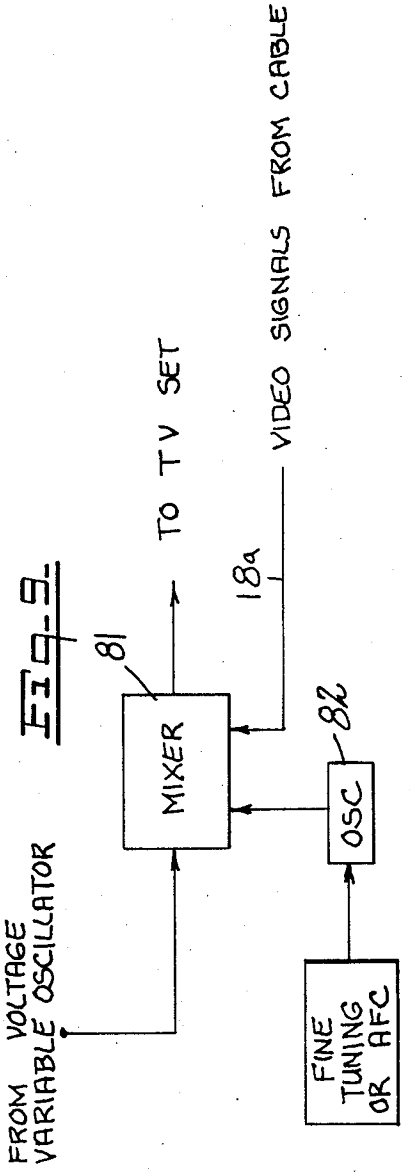

FIGS. 7*a* and 7*b* are flow diagrams of typical cycles of computer operation in the operation of the invention;

FIG. 8 is a block diagram of another embodiment of the user terminal of FIG. 4, wherein the TV converter is controlled by the head end for channel selection, and FIG. 9 is a block diagram of a further embodiment of the user terminal of FIG. 8.

Figure 1:
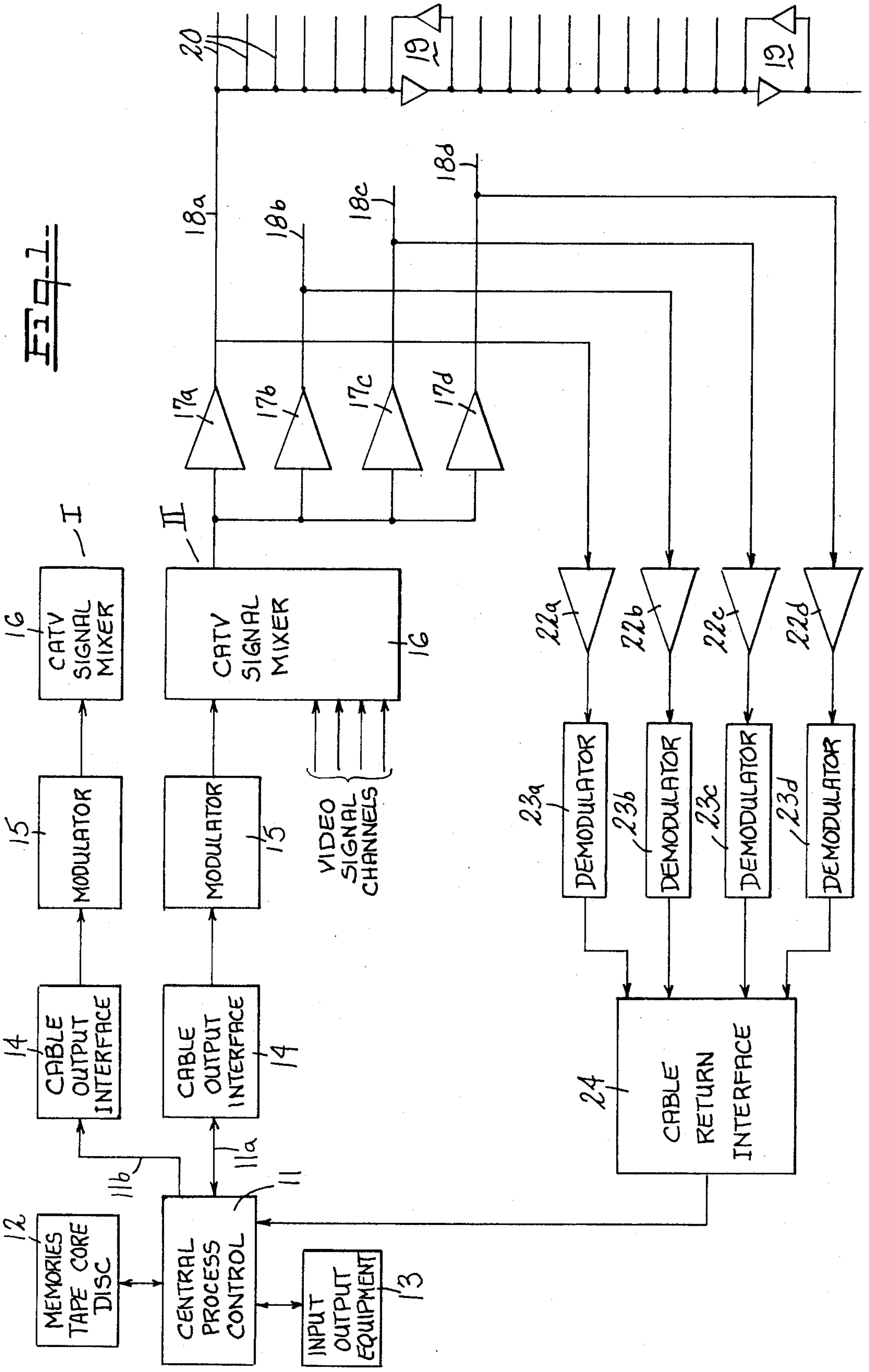
FIG. 1 is a diagram in block form of the equipment located at the transmitting end of a system embodying the invention.

A system embodying the invention, as set forth in FIG. 1, generally comprises at the central station a central processing control which would be a computer 11, and may suitably be of the type known as PDP11 of Digital Equipment Corporation. The central process control will be programmed to provide functions hereinafter described. The computer 11 may have various memories such as tape, core, disc, or another computer 12 associated therewith together with the conventional input, output equipment 13 which may be in the forms of keyboards, card or tape readers, printers, etc. Process control 11 may serve two or more cable systems as exemplified by systems I and II. However, only one cable system, system II will be described.

The process control will provide a signal in binary form for transmission to a selected user terminal. For purposes of example, the signal will be considered to be 32 bits, which is logically arranged to comprise a start bit, 14 address bits, and a stop address bit, followed by 15 data bits and a stop bit.

With this exemplified arrangement, each cable system may include up to 64,000 users, which may be connected to four parallel cables. Dependent on the length of the cables and other factors such as population density along a cable, more or less than four, or only one, may be utilized to serve the 64,000 users. The number of users may be doubled for each address bit added to or defined as such in the message signal. The transmitted message signal will hereinafter be referred to as a polling signal. The polling signals are applied to the cable systems I, II, etc., over lines 11*a*, 11*b*, through cable output interfaces 14 to a modulator 15 where they are frequency shift keyed and applied to a CATV signal mixer 16 together with a plurality of video signals at the various channel frequencies. The video signals, together with the encoded messages in binary form, are applied through a plurality of forward amplifiers 17*a*, 17*b*, 17*c*, 17*d* to a plurality of coaxial cables 18*a*, 18*b*, 18*c*, 18*d*, respectively. Along each of the cables 18*a* – 18*d* may be a plurality of two-way amplifiers 19, and a plurality of lead-offs or drops 20 to the user terminal. The cables 18*a* – 18*d* are also connected to return amplifiers 22*a* – 22*d* and the output of the return amplifiers is applied to demodulators 23*a* – 23*d*, respectively.

The demodulators extract digital information and clock pulses in serial form from the return frequencies. The serial information is then forwarded to a cable return interface 24 where the computer is signalled that a message has arrived and is available to the control processor 11 in parallel for interpretation and any action necessary.

Figures 2, 3:
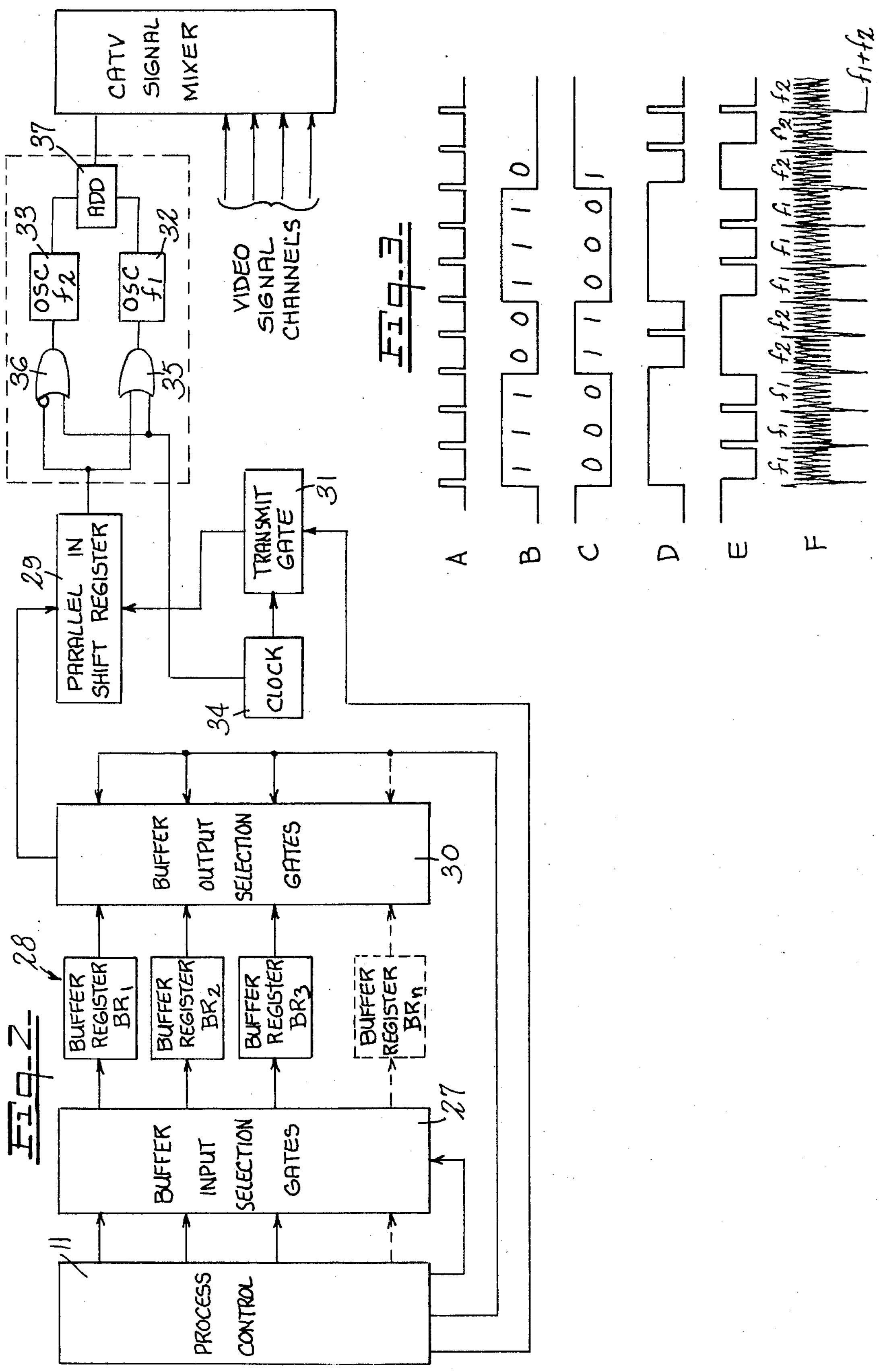
FIG. 2 is a diagram, partly in block form and partly in schematic of the data interface between cable systems and a computer process control together with a polling message modulator.
FIG. 3 is a diagram of various waveform inputs and outputs of the modulator of FIG. 2.

FIG. 2 exemplifies a cable output interface 14 together with the encoding of the information carrier. A polling signal including a user terminal address is applied to input selection gates 27 upon enabling by a command from the process control to data buffer registers 28*a*. Upon command, a polling signal is transmitted in parallel from one of registers 28 to a shift register 29 through buffer output selection gates 30.

Shift register 29 will shift the polling signal sequentially to modulator 15 when transmit gate 31 is enabled. Modulator 15 comprises oscillators 32 and 33 which are keyed by data bits of the polling signals and clock pulses. Shifting in register 29 is under the control of clock pulses as shown in waveform A of FIG. 3, which are applied to the shift register 29 from a clock when transmit control gate 31 is enabled. The data pulses are shown in waveform B as shifted from register 29 through OR gate 35 while waveform C shows inverted data pulses passed through OR gate 36. The data and data pulses of waveforms B and C are applied to OR gates 35 and 36 together with the clock pulses to produce the waveforms D and E from gates 35 and 36, respectively, which correspond to waveforms B and C, the only difference being the clock pulses imposed on the data and data pulses.

The waveforms D and E of FIG. 3 are the result of ORing the clock pulse with the data and data signals. The waveforms D and E are applied to oscillators 32 and 33, respectively, and the outputs thereof added in a frequency adder 37. The oscillators 32 and 33 are arranged to be keyed at a set frequency when the pulse input is at a logic one or zero level, respectively. Therefore, oscillator 32 will be keyed during the first three clock periods by the data one pulses. During this time interval, oscillator 33 will be keyed only during the time of the actual clock pulse. Therefore, during the time of the first three clock pulses, there will be three outputs of frequency $f_1$, separated by bursts of $f_1 + f_2$ emanating from adder 37. Due to the inherent delay in the trailing edge of the data bits resulting from the ORing of clock and data, there will be keying of both of oscillators 32 and 33 when data changes from a high level to a low level. Thus, there will be spacing of the frequency keyed data bits by the added frequencies $f_1$ and $f_2$. In the example shown, there will be three intervals of frequency $f_1$ followed by two intervals of frequency $f_2$, followed by three intervals of frequency $f_1$ and a final three intervals of frequency $f_2$. This represents the code 11100111000 which is a portion of a polling signal. This signal is transmitted through the CATV mixer 16 together with the video signals. The frequencies $f_1$ and $f_2$ may be anywhere in the forward passband of the cable system. Available spectrum indicates that frequencies from 108 to 120MHZ could be used. The resultant transmitted signal thus contains the frequency logical one and zero bits separated by clock pulses. In FIG. 3, the frequency $f_1 + f_2$ is represented by a higher amplitude merely to show the time relation between the data pulse and the clock pulses.

The foregoing arrangement provides one means for transmitting data pulses together with timing or clock signals. The system may also employ a bi-phase digital data technique to frequency shift key a modulator in which case the signal received at the user terminal would be self-clocking.

The user or subscriber terminal is one which is economical in design in view of high volume production requirements and provides maximum flexibility for the greatest usage. FIG. 4 illustrates a user terminal connected to cable 18*a* over a drop 20.

A user terminal 40 comprises a demodulator 41 which is effective to demodulate the incoming polling signal made up by the frequencies $f_1$, $f_2$ and $f_1 + f_2$. In response to these frequencies the demodulator will apply outputs logical ones and zeros corresponding to the frequencies $f_1$ and $f_2$ in the order received and will also generate clock pulses responsive to the frequency $f_1 + f_2$.

The demodulator 41 comprises two demodulators 42 and 43 each tuned to one of frequencies $f_1$ and $f_2$. AND gate 44 regenerates the clock pulses when frequencies $f_1$ and $f_2$ simultaneously occur. AND gate 45 regenerates the data pulses in one and zero logic levels when data and inverted data pulses coincide. The clock pulse may be slightly delayed so as not to exactly coincide with the leading edge of the data pulses in the shift register.

The data pulses are clocked in a shift register 46. An address decoder 47 is coupled to register 46 and arranged to identify only one address. The decoder 47 may comprise coincidence gates jumpered to the address stages of register 46.

If the address in the polling signal applied to shift register 46 is not recognized as the address of this drop, there is no response. However, if the address is recognized by address identification and decoder 47, a signal is applied to an enable memory 48. Memory 48, which may be in the form of a flip-flop is turned on and will remain on for a predetermined time. A timer 49 may be in the form of a monostable multi-vibrator or a counter, which will reset memory 48 after a predetermined time. This time is selected to be sufficiently long to enable a modulator 50 to transmit a return message, for example, 32 bit times.

A user register 51 is provided which stores in binary form various data such as the channel selected, alarm situations, such as smoke, fire alarms or even a burglar alarm, a lock-out code and other information as to whether the local converter is in operation.

If the identification decoder 47 recognizes a message addressed to its station, it will open transfer gates 52 and the data bits in register 51 are transferred through gates 52*a* to shift register 46 in parallel in the proper sequence behind the address code. Then the information from register 51 is transmitted by modulator 50 back over cable 18*a*. The construction of modulator 50 is the same as that of modulator 15 exemplified in FIG. 2 using frequency shift keying techniques with two oscillators. However, in the case of modulator 50 the carrier frequencies would be in the lower end of the bandwidth of the cable which conventionally is allocated for return signals. For example, modulator 50 might transmit frequencies of 19 and 21 MHZ to represent logic one and zero levels. Drop 20 is also applied to a user frequency converter 53 to reconvert the video signals to the channel frequencies of the TV set 54.

The user terminal 40 may exert control over the converter 53 through control of its oscillator 55.

This may be accomplished through the user register which may incorporate a command decoder 51*a*. If the address is recognized, transfer gates 52*b* are opened and data applied to command decoder 51*a*. Command decoder 51*a* may comprise a plurality of coincidence gates for decoding purposes and one or more flip-flops for storing a command.

In the case of programming, only for special groups such as doctors, the transmitted code may disable the oscillators of converters of non-valid user terminals if the user turns the channel selector 56 of his converter to that channel. By the same token, if the subscriber is not eligible for a program on a channel for which there is a charge, the oscillator 55 may be turned off if the user selects that channel. However, in no event would the converter 53 be rendered inactive if the user was tuned to a free channel. The condition and selection of the converter 53 is always indicated and encoded in the user register 51. A shaft position encoder 57 is incorporated on the channel selector 56 and signifies the selected channel to register 51 in a binary code.

Assume that there is a first-run movie on channel 25 of the converter and the user is eligible to receive the program, the user merely turns to that channel and information indicative thereof is placed in user register 51. This is then reported to the central processing station every time this user terminal is polled or interrogated. The computer may be programmed to check this on a time interval basis such as every 5 minutes and record the total time of viewing so that the user would be billed on a time basis. However, assume that the user is not eligible to receive programs on this channel. For example, a special program may be broadcast on a particular channel for a specific meeting or convention at a hotel or motel. If he turns his selector to this channel such information will be encoded in the user register 51 and this data returned to the central processing station at the next polling message where it would be compared to the eligibility record of the subscriber. If the subscriber has selected a channel for which he will not be eligible, then upon the next polling of that user, decoder 47 would apply a disabling signal to oscillator 55 in the converter 53. This would be repeated on every polling message and therefore the ineligible subscriber could not receive that particular channel. However, as soon as he turned to a channel for which he was eligible, the shaft encoder 57 would so signify, and the next polling signal would pick up the new station selection. On the next polling address to this drop, decoder 47 would remove its disabling signal from oscillator 55 and reception would be resumed.

In an alternate embodiment, the converter may be arranged such that the oscillator 55 is always enabled when free channels are selected, and the user must make a positive request for a pay channel selection.

The decoder 51*a* would activate a flip-flop in the user register providing an enabling signal or disabling signal to oscillator 55. In such arrangement, the register bit would be set or reset, as the case may be.

Provision is also made to prevent selection of a pay channel at the user terminal by unauthorized persons such as children, baby sitters, etc. A user lockout signal may be inserted in the register by means of a key and encoder mechanism (not shown). Then register 51, responsive to selection of specific channels applies a NO-GO or cancelling signal to register 51, which in turn controls the oscillator ON/OFF function directly or through the head end computer.

User register 51 is a multi-bit binary storage register in which various messages and information may be stored for transfer to shift register 46.

As a check of the operability of register 51, a data control signal is applied to register 51 from enable flip-flop 48 when the address is recognized. Such signal may interrogate all stages of register 51 to determine that they are operative, and so signify in the return code.

A user response terminal 59 may also be provided at terminal 40 to answer opinion polls, make requests to purchase advertised items or services or request further information thereon. Terminal 59 may include a plurality of selection switch operating buttons 60 to indicate a positive response is being made. Terminal 59 may also be arranged to be locked out by the user. The data control signal may also be utilized to clear any information from terminal 59.

Assuming a 32 bit polling and return message, the format may be as follows:

| Data Bits | Transmit Message |
|---|---|
| 1 | Start Bit |
| 2 – 17 | User Address |
| 18 | Oscillator Off-On |
| 19 | Data Control |
| 20 – 31 | Return Message Space |
| 32 | Stop Bit |

| Data Bits | Return Message |
|---|---|
| 1 | Start Bit |
| 2 | Converter Off-On |
| 3 – 7 | Channel Selected |
| 8 | User Lockout |
| 9 – 11 | Alarms |
| 12 | Control Data |
| 13 – 16 | Response to Opinion Poll |
| 17 – 18 | Request to Purchase Advertised Item |
| 19 – 31 | Available |
| 32 | Stop Bit |

It will be noted that the address need not be included in the return message since the next polling signal will not be transmitted until there is a response to the preceding polling message.

When a polling message of proper address is introduced into shift register 46, flip-flop 48 is set and timer 49 is turned on. Timer 49 may be set for a 32 clock pulse period, corresponding to the number of stages. As enable flip-flop 48 is set and, prior to the next clock period, transfer gates 52*a* and 52*b* are opened and the contents of register 51 transferred to shift register 46 in parallel. At the same time, commands from the control processor are applied to register 51. Then during the next 32 clock pulses, the 32 bits are transmitted through modulator 50 back to cable 18*a*.

At the end of this transmission, timer 49 times out, resetting flip-flop 48 which disables modulator 50. As other user drops are polled, polling messages are demodulated and entered into shift register 46. However, if the address code is not correct, the data bits are merely shifted through register 46, and no transmission of data is made from the user terminal.

It will be apparent that each polling message is entered into every shift register on a cable system. The clock pulses are normally continuously transmitted and will subsequently clear all of register 46.

It will be understood that all of the elements shown in FIG. 4 may be packaged in one housing, or a logic box provided to be combined with a 26 or more channel converter now commonly used on CATV systems.

Figure 5:
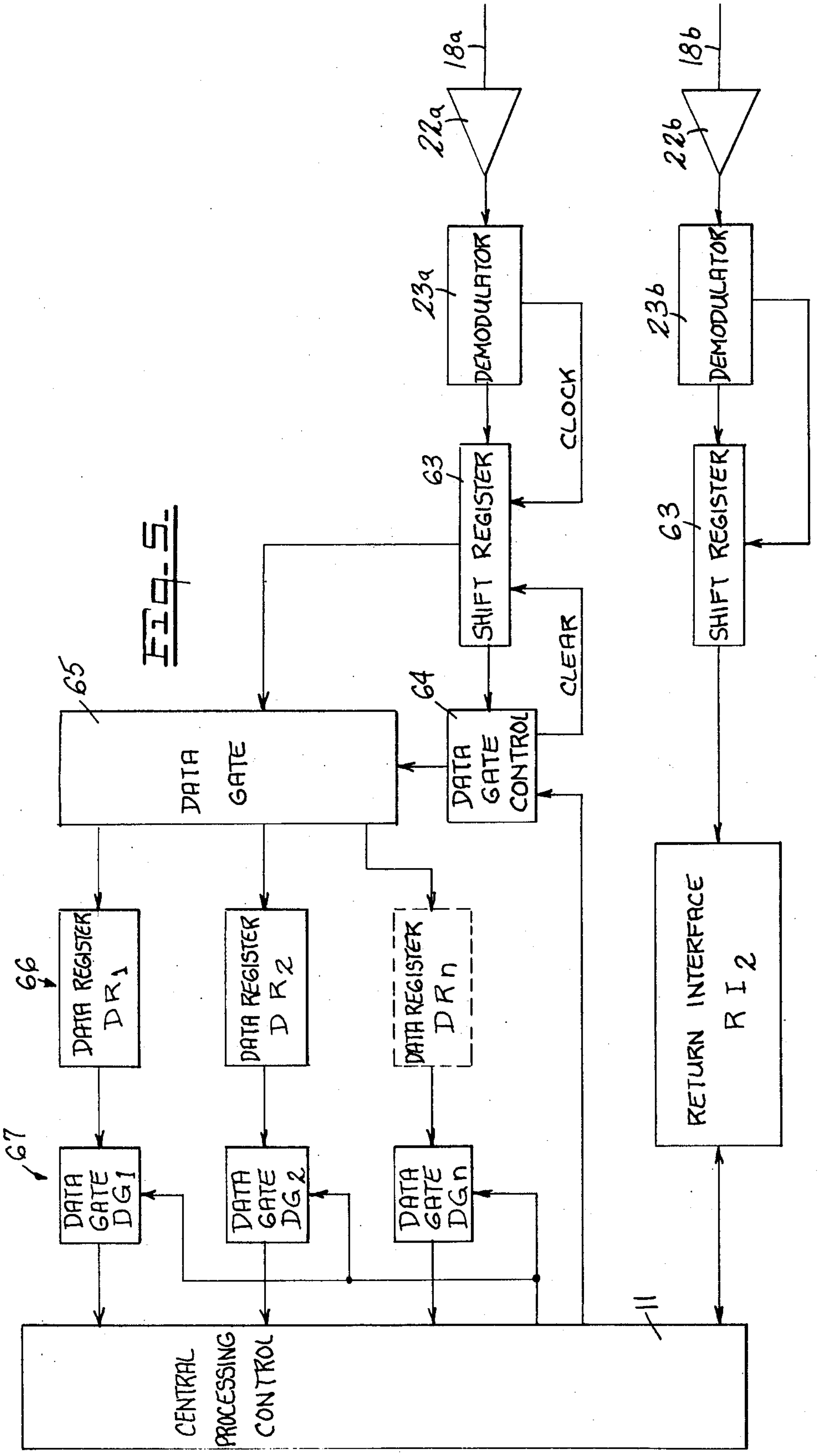
FIG. 5 is a block diagram of a return interface between a cable system and a computer process control.

FIG. 5 exemplifies the return interface of the cable to the central processing control. On the returns, each of the cables 18*a* – 18*d* has its own interface, and only that connected to cable 18*a* will be described.

The user message signal which will be returned at a frequency of 50 MHZ or below is applied to a demodulator 23*a* through amplifiers 22*a*. Demodulator 23*a* is constructed in the same manner as demodulator 41 of FIG. 4. The demodulated data is clocked into a shift register 63. When register 63 is full it so signifies to a data control gate 64 which in turn so signifies to processing control 11. Processing control 11 signals gate 64 to transfer the contents of shift register 63 through a data gate 65 in parallel to one of a plurality of data registers 66 for storage until processing control 11 will accept the message. Then the appropriate data gate 67 is opened to transmit the received user message for processing and interpretations. The central processing control 11 may identify the address of the response in data registers 66 in accordance with the time received, if there is more than one response stored in the return interface.

The data registers 66 provide temporary storage of a return message and together with gate control 64 signify that a particular cable is clear for another polling message.

The system described in conjunction with FIG. 1 in which each cable system is in parallel with each other with respect to the process control may be referred to as a "hub" system in that all cable systems emanate from a central hub.

Figure 6:
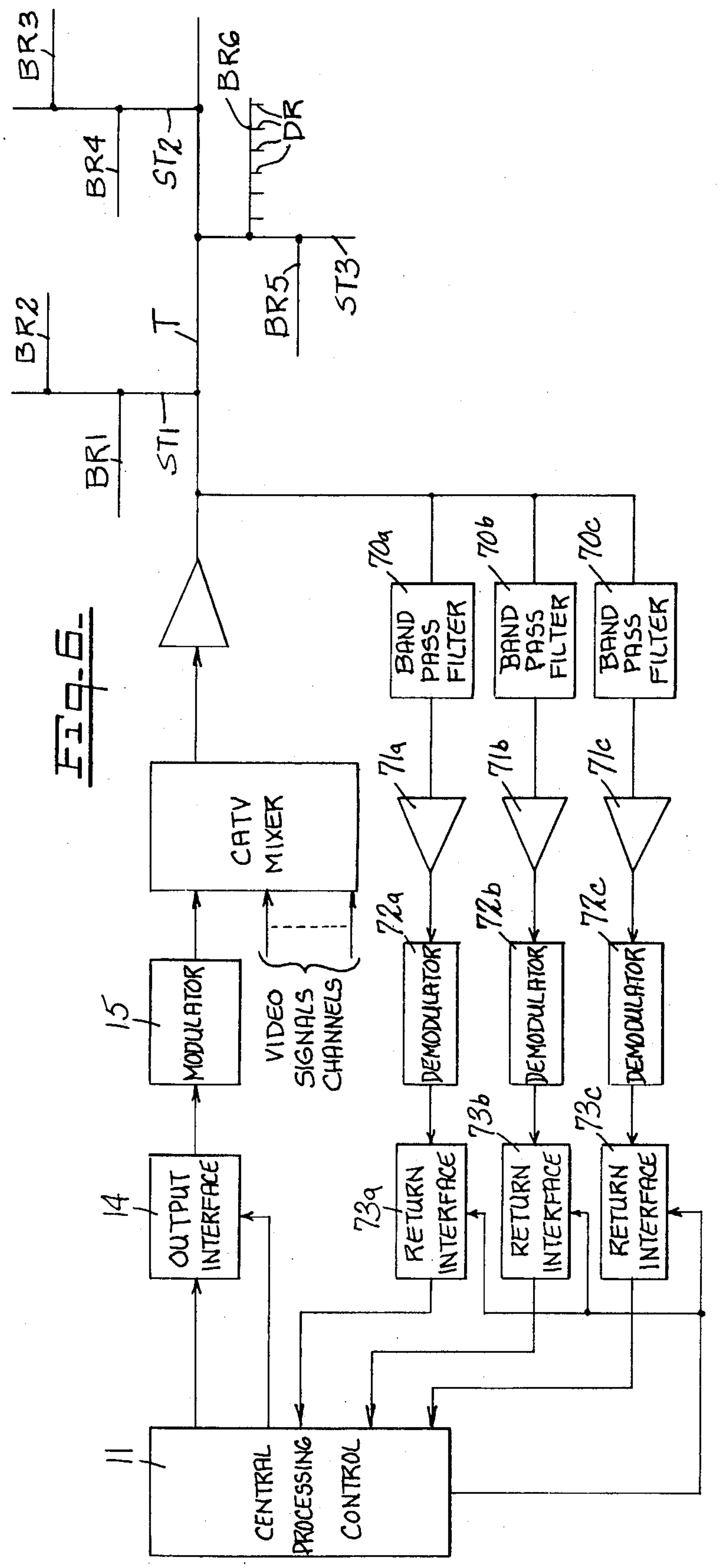
FIG. 6 is a block diagram of an alternate arrangement of the equipment located at the transmitting end.

Some existing systems may not be adaptable to such an arrangement in that there may be a main trunk cable with several sub-trunk cables taken therefrom with branches leading from the sub-trunk and, hence, drops off of the branches. This is represented in FIG. 6 by the trunk line T, sub-trunks ST1, ST2, ST3, branches BR1 — BR6, and drops DR.

Such a system is likely to have many more users on one trunk than a single cable system in a hub arrangement. To overcome propagation delays in this arrangement multi-channel return communications are used with each channel return having the effect of a separate cable. Only one outgoing channel is required.

A plurality of band-pass filters 70*a* – 70*c*, having approximately four MHZ bandwidths below 50 MHZ may be connected to trunk cable T. The frequencies passed by the filters are amplified by amplifiers 71*a* – 71*c*, applied to demodulators 72*a* – 72*c* and return interfaces 73*a* – 73*c* as previously described. Each interface will then apply the returned messages to a distinct process control input corresponding to a given sub-trunk or branch. The demodulators 72*a* – 72*c* may be constructed as described in conjunction with FIG. 2, the only difference being that each is responsive to a different pair of frequencies to provide bit data and clock pulses. The return interfaces 73*a* – 73*c* are constructed as described in conjunction with FIG. 2.

It is within the scope of the invention to provide two or more trunk systems emanating from the same process control.

The user terminals as shown in FIG. 4 are the same in either system with the exception of different return frequencies on different sub-trunk or branch lines.

A computer comprising the central process control is programmed to provide all polling messages including addresses and instructions, interpretation and recording functions. Simplified flow diagrams of sequences of operation are exemplified in FIG. 7. Initially, the user addresses are sequentially selected from a memory in a polling sequence. The polling sequence may be modified on priority bases to accommodate requests from a user terminal. The polling sequence is divided into cable systems and individual addresses. The polling messages are loaded into the transmit interface buffer register 28 for an appropriate cable system placed in shift register 29, and clocked to modulator 15 for transmission. Such transmission will include the address of the user and any special instructions to the converter and data control line of the user register. There is a transmission delay until the polling message is received at the address user terminal. During this delay, the computer is inactive with respect to that system but will transmit polling messages on the other cable systems. As the user message signals are received, they are stored in the return data registers 66 of that cable system. At this time, a signal is applied to the computer that this cable system is clear for another polling message and the received user message may be accepted by the computer for interrogation and such action as is necessary. If the return message shows NO requirements that user address is placed on the low priority process program for polling. If the interrogation of the received message shows a YES response for a requirement, it will be placed on a priority next polling list and any request for service will be compared with user restrictions. If the response shows selection of a fee channel, this will be recorded for polling purposes and subsequently monitored for time of use of the fee channel.

Any special requests as for further information or response to a commercial may be read out as by printer or otherwise, and any alarm may be displayed on an alarm panel.

If the user has selected a channel having special programming for which he is not eligible or has selected a fee channel while he is in arrears in payment for fee channel service, subsequent polling messages may contain data to disable all fee channel reception through disabling his converter oscillator, as previously explained.

In a similar manner, if the user has exercised his lockout privilege, such information will be stored on his eligibility record and no other person can select a fee channel. If this occurs, all subsequent polling messages will contain a command to disable the converter oscillator if a fee channel has been selected.

At any time any eligibility, ineligibility or restriction of a particular user may be updated in the computer memory.

FIG. 8 exemplifies an alternate form of user terminal wherein the user frequency converter is completely controlled by the central processing station in response to the user's request from register 51. The user terminal of FIG. 8 includes the elements of FIG. 4, which are omitted in FIG. 8 for simplicity of illustration. The frequency converter includes a crystal controlled oscillator 70', a frequency comparator 76, a frequency divider 77, and a voltage variable oscillator 78. The voltage variable oscillator is of the type where the output frequency varies as a function of a voltage level applied thereto.

In response to the user selecting a given channel by means of push buttons on a selector 79 and encoding such selection in the user register 51, the next polling message signal will provide a command from command decoder 47 which sets a frequency divisor into frequency divider 77. This divisor, in essence, states that the output of the voltage variable oscillator divided by the divisor N shall equal the frequency of the crystal controlled oscillator 70'. Frequency comparator 76 will then compare the frequency output from divider 77 with the crystal controlled oscillator 70' and apply a correction or regulating signal over line 80 to voltage variable oscillator 78 to change the voltage thereof so that the output of frequency divider 76 is the same as or in a predetermined relation to oscillator 75.

The resulting frequency output of voltage variable oscillator 78 is applied to the mixer 81 together with the video signals from cable 18*a*. In this manner, a local frequency is generated for mixing with the video signals to produce the selected video channel. The mixing of the signals in mixer 81 results in a signal which may be applied directly through the tuner of the TV set or to the IF section of the TV set without the need for a tuner or channel selector in the TV set. In this arrangement, the program to be viewed is selected directly from the selector on the converter.

FIG. 9 illustrates a further embodiment of the converter of FIG. 8 where the TV set is equipped with the usual tuner which is permanently set at a given channel. In this case, the oscillator 82 in the TV tuner would have an output applied to mixer 76 together with the video signals from cable 18*a*.

The elements of user terminals shown in FIGS. 8 and 9 may be conveniently packaged in one housing member. The input would merely be the cable drop, and the output would be a lead to the TV set antenna terminals.

The polling signals will be transmitted at frequencies of 108 MHZ and above which is presently above the VHF television and FM frequency spectrums, while the return messages will be transmitted at frequencies below the VHF television spectrum, below 54 MHZ.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A two-way communications system including a central station and a plurality of remote stations coupled to a coaxial cable with said remote stations arranged to be polled by the central station, first means at said central station for transmitting polling signals in a first frequency encoded logic bit form over the cable to said remote stations, each polling signal including an address code-word peculiar to one remote station, each of said remote stations comprising a shift register, means for demodulating the frequency encoded signal and applying the demodulated signal serially to said register, a return message register for storing information in logic bit form indicative of a condition at the remote station, means coupled to said shift register for identifying the address of a demodulated signal therein, means responsive to said identifying means for transferring data in said return message register to said shift register, second transmitting means for serially frequency encoding the data in said shift register at a second frequency, and means for shifting data in said shift register to said second transmitter, the output of said second transmitter being coupled to the cable.

2. A two-way communications system for use on a television cable comprising a central station and a plurality of user terminals connected to said cable, means at said central station for transmitting polling signals in a first frequency encoded logic bit form over said cable, each of said polling signals containing an address code of one user terminal, each of said user terminals including means for demodulating each polling signal to logic bit form, a shift register for receiving the demodulated polling signal, means for identifying a demodulated polling signal addressed to that user terminal, a video signal frequency converter, a user register adapted to store data in logic bit form indicative of at least one condition of the frequency converter, means responsive to said identifying means for transferring data in said user register to said shift register in parallel, a modulator for serially frequency encoding the data in said shift register, means for shifting the contents of the shift register to said modulator, said modulator being operable at a second frequency lower than said first frequency, and means for applying the output of said modulator to the cable.

3. For use in combination with a coaxial cable transmission medium for providing video signals together with messages including single user addresses to individual ones of a plurality of user terminals where the messages are transmitted on said cable in frequency encoded serial data bits together with frequency encoded clock pulses; a user terminal comprising means for demodulating the frequency encoded bits and clock pulses to serial logic level pulses and local clock pulses synchronous with the transmitted clock pulses, a shift register, means for applying the demodulated logic level pulses serially to said shift register in time with the clock pulse, means responsive to data in said shift register for identifying a message to the user terminal, a user register for storing data in logic bit form, means responsive to said identifying means for transferring the data in said user register to said shift register, and a modulator coupled to said shift register and said clock pulses adapted to frequency encode data from said shift register, and transmit return messages to the cable.

4. The arrangement of claim 2 wherein the messages transmitted to said user terminals are polling signals to determined if any data is stored in said user registers.

5. The arrangement of claim 4 wherein said polling signals transmitted to said user terminal are transmitted at a frequency above the VHF video frequency range.

6. The arrangement of claim 3 wherein the data in said shift register including the station address are transmitted to said cable at a second frequency below the VHF video frequency range.

7. The combination of claim 2 wherein said polling signals are sequentially transmitted to each of said user terminals.

8. The combination of claim 7 wherein each of said user terminals has a different address.

9. The combination of claim 2 wherein said user terminals are arranged in groups connected to separate branch cables, each of the user terminals on a branch cable having a return frequency different from those of other branch cables.

10. In a system including a transmitter arranged to transmit video signals over a coaxial cable and transmit messages including single user addresses to individual ones of a plurality of user terminals where the messages are transmitted in frequency encoded serial data bits together with frequency encoded clock pulses; a user terminal comprising a video signal frequency converter having a video channel selector, means for demodulating the frequency encoded bits to serial logic level bits and local clock pulses, a shift register, means for applying the demodulated bits serially to said shift register under control of the local clock pulses, means responsive to data in said shift register for identifying a message to the user terminal, a user register adapted to store data in logic level bit form representative of a condition at the user terminal and including the video channel selected by said converter selector, means responsive to said identifying means for transferring the data in said user register to said shift register, a modulator adapted to frequency encode logic level bits, and means for applying the logic level bits in said shift register to said modulator under control of the local clock pulses to provide a return message, the output of said modulator being coupled to said cable.

11. The system of claim 2 further including means at said user terminals for disabling said frequency converter.

12. In a system for use in the transmission of video signals including a main cable connected to a central station, said central station including means to transmit a plurality of video signals over said cable and messages to individual user stations coupled to the cable in frequency encoded logic level bit form together with frequency encoded clock pulses, each transmitted message including an address peculiar to one user station, a plurality of remote user stations coupled to said cable; each of said user stations including a video frequency converter and channel selector adapted to tune to selected video channels; each user station comprising means for demodulating a transmitted message to serial logic level bits and the frequency encoded clock pulses to local clock pulses, a storage register responsive to the local clock pulses for serially receiving the logic level pulses, means responsive to the message in said storage register for identifying a message to the addressed remote station, a return register adapted to store information derived at the remote station in logic level bit form, means responsive to said identifying means for transferring the information in said return register to said storage register, a local transmitter coupled to said storage register and to the local clock pulses of said demodulator for transmitting to the cable in frequency encoded serial form the data content of said storage register and the clock pulses, and means for encoding the position of said converter channel selector and applying the encoded position to said return register.

13. A remote station for use with a two-way communications system which includes a transmitter at a central station which transmits over a coaxial cable to a plurality of remote stations connected in parallel to said cable and where each remote station has an identifying address peculiar to that station, said transmitter transmitting frequency encoded serial data bits and clock pulses on a carrier, said data bits identifying the address of one remote station; each remote station comprising means for demodulating the frequency encoded data bits to serial logic level pulses and the frequency encoded clock pulses to local clock pulses, a storage register responsive to the local clock pulses for serially receiving the logic level pulses, means responsive to the address in said storage register for identifying a message to the addressed remote station, a return register for storing information at the remote station in logic level bit form, means responsive to said identifying means for transferring the information in said return register to said storage register, and a local transmitter coupled to said storage register and to the local clock pulses of said demodulator for transmitting in frequency encoded serial form the content of said storage register to the cable.

14. The system of claim 13 wherein said storage register is a serial shift register, and said means for transferring data in said return register to said shift register transfers such data in parallel.

15. For use in combination with a central station which transmits over a coaxial cable to a plurality of remote stations connected in parallel to said cable and where each remote station has an identifying address peculiar to that station and the central station has transmitting means for transmitting on said cable a polling message in frequency encoded serial data bits and clock pulses on a carrier, each message, including an address peculiar to one remote station; a remote station, said remote station including means for demodulating the frequency encoded data bits to serial logic level bits and the frequency encoded clock pulses to local clock pulses, a storage register having a plurality of stages and responsive to the local clock pulses for serially receiving the logic level bits in said stages, means responsive to the logic level bits in said storage register for identifying a message to the addressed remote station, a return register having a plurality of stages for storing information indicative of a condition at the remote station in logic level bit form, means responsive to said identifying means for transferring the information in said return register to said storage register, and a local transmitter coupled to said storage register and to the local clock pulses of said demodulator for transmitting in frequency encoded serial data bits the content of said storage register to said cable.

16. The remote station of claim 15 wherein data in said return register is transfered to said storage register in parallel.

17. The system of claim 15 further including a signal responsive device at said remote station and means at said remote station responsive to an identified polling message for controlling operation of said signal responsive device.

18. The system of claim 15 further including a video signal frequency converter at said remote station, said return register arranged to store data indicative of a condition of said converter.

* * * * *

PO-1050
(5/69)

UNITED STATES PATENT OFFICE
CERTIFICATE OF CORRECTION

Patent No. 3,859,596 Dated January 7, 1975

Inventor(s) George E. Jannery - Mark P. Messinger

It is certified that error appears in the above-identified patent and that said Letters Patent are hereby corrected as shown below:

Column 14, line 23 - after "message" delete the comma.

Signed and sealed this 17th day of June 1975.

(SEAL)
Attest:

RUTH C. MASON
Attesting Officer

C. MARSHALL DANN
Commissioner of Patents and Trademarks